United States Patent
Leal

(10) Patent No.: US 8,210,595 B2
(45) Date of Patent: Jul. 3, 2012

(54) LAP SHADE

(76) Inventor: Thomas E. Leal, San Bernardino, CA (US)

( * ) Notice: Subject to any disclaimer, the term of this patent is extended or adjusted under 35 U.S.C. 154(b) by 351 days.

(21) Appl. No.: 12/234,984

(22) Filed: Sep. 22, 2008

(65) Prior Publication Data

US 2010/0072773 A1 Mar. 25, 2010

(51) Int. Cl.
*B60J 3/00* (2006.01)
(52) U.S. Cl. ............................................... 296/97.1
(58) Field of Classification Search ............. 296/97.1, 296/97.7, 97.8; 49/501, 502, 504; D12/182, D12/183, 191, 400, 401; 160/370.21, DIG. 2, 160/DIG. 3; 150/166; D25/53
See application file for complete search history.

(56) References Cited

U.S. PATENT DOCUMENTS

| | | | |
|---|---|---|---|
| 4,109,957 A | 8/1978 | Polizzi et al. | |
| 4,202,396 A | 5/1980 | Levy | |
| 4,332,414 A | 6/1982 | Surtin | |
| 4,759,581 A * | 7/1988 | McNamee | 296/97.7 |
| 4,818,007 A * | 4/1989 | Mahoney | 296/97.7 |
| 4,940,274 A * | 7/1990 | Ogren | 296/97.7 |
| 5,002,327 A * | 3/1991 | Bickford | 296/97.7 |
| 6,029,278 A | 2/2000 | Lopez | |
| D559,161 S * | 1/2008 | Leal | D12/183 |
| 2007/0075975 A1* | 4/2007 | Aguilera | 345/169 |
| 2009/0115218 A1* | 5/2009 | Nguyen | 296/97.7 |

* cited by examiner

*Primary Examiner* — Lori Lyjak
(74) *Attorney, Agent, or Firm* — Ardent Law Group, PC

(57) ABSTRACT

The present invention is a lap shade that comprises a plurality of section pads attached to form a dashboard piece, a plurality of frames attached to form a door piece, and a plurality of attachment means on both the dashboard piece and the door piece for attachment purposes on the dash board and a side window of a vehicle respectively. A hook and fastener is attached at a bottom side of the dashboard piece to be engaged with a hook and fastener on the door piece. The lap shade includes a plurality of joints, which allow folding of the lap shade. The plurality of attachment means on the dashboard piece is provided with a sliding mechanism, which includes a slider assembly to allow the attachment means to be extended as desired. The door piece is foldable against the dashboard piece followed by folding the section pads.

12 Claims, 8 Drawing Sheets

LAP SHADE

BACKGROUND OF THE INVENTION (1) Field of the Invention

The field of the invention is related to sunlight preventing devices, in particular, to a portable and foldable lap shade for preventing direct heat of sunlight from falling on lap of an occupant in a vehicle.

(2) Description of Related Art

Solar ultraviolet exposure is a significant environmental risk factor for the development of skin cancer. Exposure to excess sunlight prematurely ages the skin. Prolonged and frequent exposure to UV light attributes to the wrinkles, both fine and coarse, irregular pigmentation, redness, leathery, and rough texture of sun-exposed skin. Travelers often get troubled by the effects of sunlight. Automobile occupants experience serious sunburn on their body as a result of prolonged exposure to sunlight which penetrates through the side window and windshield of the vehicle. Currently, many sorts of sunshades are available for occupants in a car. Since the area of the shade cannot be regulated, they don't serve the purpose to the desired extent. Rollable textile sunshades are held together by a spring. When such a sunshade is opened, a considerable force has to be applied. Rollable textile sunshades are complicated, and their production cost is high. They often will not be rolled up uniformly and so cannot be stored, leaving their use far from ideal. Moreover this can be used only while the automobile is not in motion. U.S. Pat. No. 4,332,414 to Robert Surtin on Jun. 1, 1982 discloses a removable shade for insertion between the windshield of an automobile and the dashboard to reflect the sunlight and thereby prevent the temperature within the automobile from rising to unacceptable levels when the automobile is left in the sunlight. While this shade is effective in shading the interior of an automobile, this cannot be used while the automobile is in motion since it will obstruct the front view of the driver. This shade employ a plurality of elongated slats with elongated openings disposed in the slats between a pinned end and a free end thereof. A joinder tape is inserted through the openings to secure the slats together so that they can be opened in a fan-like manner or kept in a folded position. The joinder tape in the shade of the patent is arranged so that the shade can only be opened in one direction when the edge of the slat forming one of the openings comes into direct contact with the tape. The ability to open the shade in one direction only is limiting and the sharp edge will tend to cause the tape to fray, thereby shortening the life of the shade.

There are products out in the market to protect dashboard area when the car is parked. U.S. Pat. No. 4,202,396 to Levy on May 13, 1980 relates to a foldable, rigid cardboard sheet which is propped up on the dashboard. This invention protects the interior of motor vehicles against sun rays and blaze. But the folding cardboard shades are bulky when folded and difficult to store. When opened, the cardboard shades tend to return to the folded position thereby not providing a complete covering of the windshield. Moreover, the device is not suitable for protecting the passenger's lower body from the direct sun rays coming in through windows.

Similarly, U.S. Pat. No. 4,109,957 to Polizzi on Aug. 29, 1978 discloses a quickly removable curtain assembly for covering the inside of a vehicle windshield. The curtain assembly disclosed therein includes an opaque cloth panel for covering the windshield and front side windows of a vehicle such as a van or a recreational vehicle. While this curtain assembly is removable, it is not retractable. To remove the bulky material, one would have to fold it in some manner to reduce its size to a size manageable for storage. Further, it requires permanent installation.

In order to avoid the above problems, U.S. Pat. No. 6,029,278 to Lopez on Feb. 29, 2000 provides a device for protecting the user from the harmful effects of the sun while seated in a vehicle. Coverage is provided for the side of the user's face and neck, as well as shoulders, arms and hand. But this device does not address the need for covering the lower body, particularly, the lap of the occupant. While many of the prior art sunshades provide a certain amount of shade to the occupant, each of these shades are quite limited since it is designed to protect the vehicle rather than the occupant. Furthermore, most all of these traditional sunshades cannot be attached to the dashboard of the vehicle and in most-every case traditional sunshades are suitable for covering side windows or protecting the upper body of the passenger. Moreover, when the automobile is in motion, the prior art sunshades protect the occupants in such a way that the view of the driver is obstructed.

All referenced patents, applications and literatures are incorporated herein by reference to their entirety. Furthermore, where a definition or use of a term in a reference, which is incorporated by reference herein, is inconsistent or contrary to the definition of that term provided herein, the definition of that term provided herein applies and the definition of the term in the reference does not apply. The invention may seek to satisfy one or more of the above-mentioned desire. Although the present invention may obviate one or more of the above-mentioned desires, it should be understood that some aspects of the invention might not necessarily obviate them.

In these respects, lap shade according to the present invention substantially departs from the conventional concepts and designs of the prior art, and so doing provides a lap shade that is not anticipated, rendered obvious, suggested, or even implied by any of the prior art lap shade, either alone or in combination thereof.

BRIEF SUMMARY OF THE INVENTION

In view of the foregoing disadvantages inherent in the known types of lap shades to be used in a vehicle and means now present in the prior art, the general purpose of the present invention, which will be described subsequently in greater detail, is to provide a lap shade to prevent direct sunrays from falling on lap of an occupant in a vehicle seat.

Another object of the present invention is to provide a foldable lap shade;

Another object of the present invention is to provide a portable lap shade;

Another object of the present invention is to provide a lap shade comprising a dashboard piece and a door piece;

Another object of the present invention is to provide a plurality of attachment means on both the dashboard piece and the door piece for attachment purposes. Such attachment means can consist of such things as suction cups, magnets, and/or sticky material;

To attain this, the present invention in one embodiment generally comprises a plurality of section pads attached to form a dashboard piece, a plurality of frames attached to form a door piece, and a plurality of attachment means on both the dashboard piece and the door piece for attachment purposes. In one present embodiment of the invention, the plurality of frames is made of metal and the attachment means of the dashboard piece consists of suction cups. However, it is clear that the plurality of frames attached to form the door piece may be manufactured with other material other than metal, such as plastic, mesh or other similar material. The dashboard piece and the door piece together form the lap shade. In one possible embodiment of the present invention, the door piece includes a plurality of metal frames having a plurality of elastic bands as joints, which allow folding of the door piece. The elastic band and the hook and fastener are fixed to the door piece. It is to be noted that other materials besides elastic bands may be used to form the joints of the metal frames.

The door piece is attached to the dashboard piece by a hook and fastener means. A cloth strip is provided for the suction cups on the dashboard piece and the door piece. The door piece includes a beading on a peripheral edge. The lap shade includes a plurality of section pads having a plurality of elastic bands as joints. The plurality of elastic bands allows the lap shade to be collapsible.

A hook and fastener is attached at a bottom side of the dashboard piece to be engaged with the Velcro of the door piece. The plurality of suction cups on the dashboard piece is provided with a sliding mechanism, which includes a slider assembly to allow the suction cup to be extended as desired. The door piece is foldable against the dashboard piece by folding at least one of the section pads.

In typical use, the plurality of suction cups on the dashboard piece is attached to the dashboard piece of the vehicle and the plurality of suction cups on the door piece is attached to a side window of the vehicle.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To accomplish the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWING(S)

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

Figure 1:
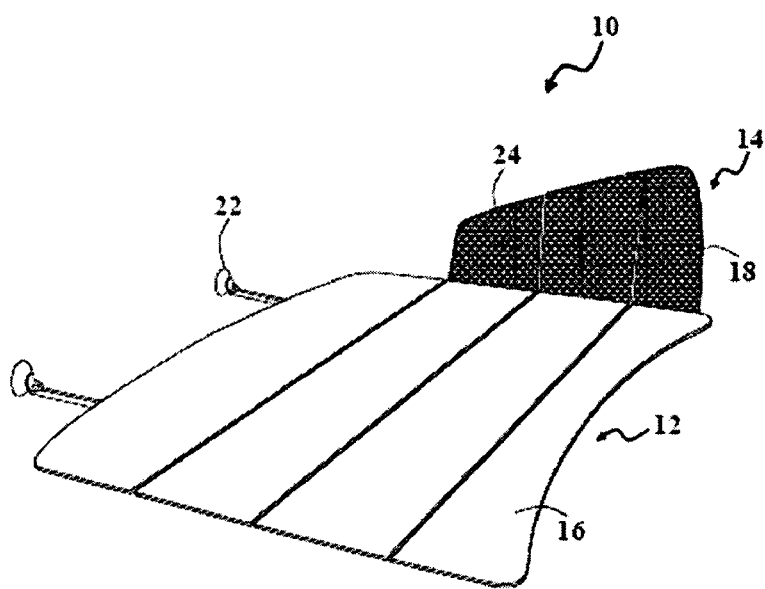
FIG. 1 is a perspective view of a lap shade in accordance with the present invention.

Referring now to the drawings, which are provided by way of illustration and example, and wherein like reference numerals designate like or corresponding elements among the several views, there is shown in FIG. 1, a lap shade 10 for an occupant 122 in a vehicle seat 128 comprises a plurality of section pads 16 attached to form a dashboard piece 12, a plurality of frames 18 attached to form a door piece 14, and a plurality of attachment means 22, 24, 58 on both the dashboard piece 12 and the door piece 14 for attachment purposes. In this present embodiment of the invention, the attachment means consists of suction cups and the plurality of frames consists of metal frames. The dashboard piece 12 and the door piece 14 together forms the lap shade 10 to prevent direct sunlight from falling on lap of the occupant 122.

Figure 2:
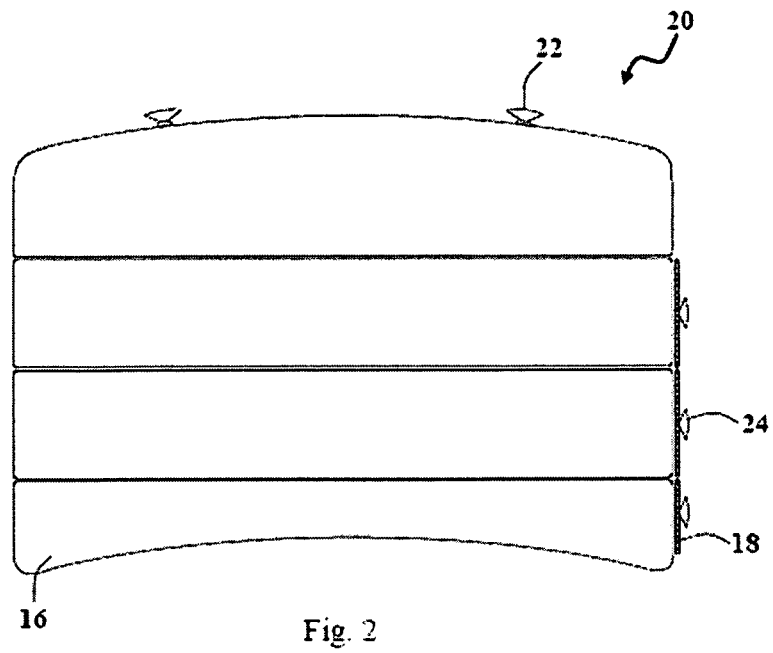
FIG. 2 is a top plan view of a lap shade.
Figure 3:
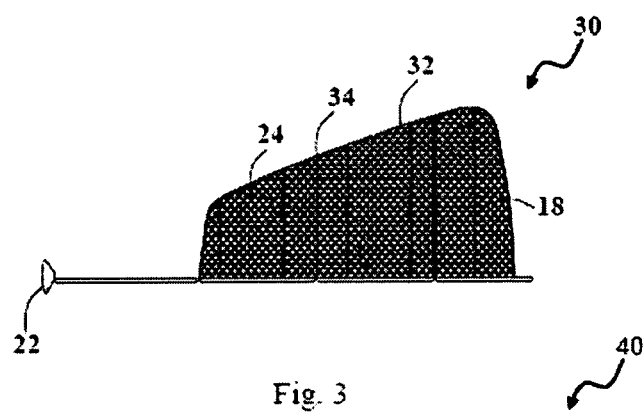
FIG. 3 is a side view of a lap shade.

Turning now to the embodiment of FIG. 2, shows a top plan view of a lap shade 20. A dashboard piece 12 can be made from any flexible material. As shown in FIG. 3, a door piece 14 includes a plurality of metal frames 18 having a plurality of joints 34. In this present embodiment of the invention, the joints consist of elastic bands. The elastic bands 34 allow folding of the door piece 14. The door piece 14 can be made from any type of mesh. The door piece 14 can be manufactured by placing a UV resistant cloth around a plurality of metal frames 18 and stitching the UV resistant cloth in and outside of the plurality of metal frames 18. An elastic band 34 and a hook and fastener of the door piece 56 are fixed to the door piece 14.

Figure 4:
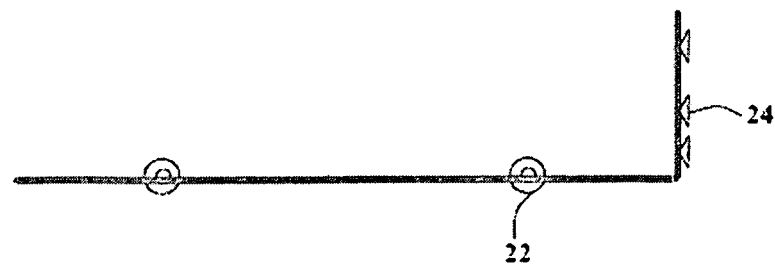
FIG. 4 is a front view of a lap shade.
Figure 5:
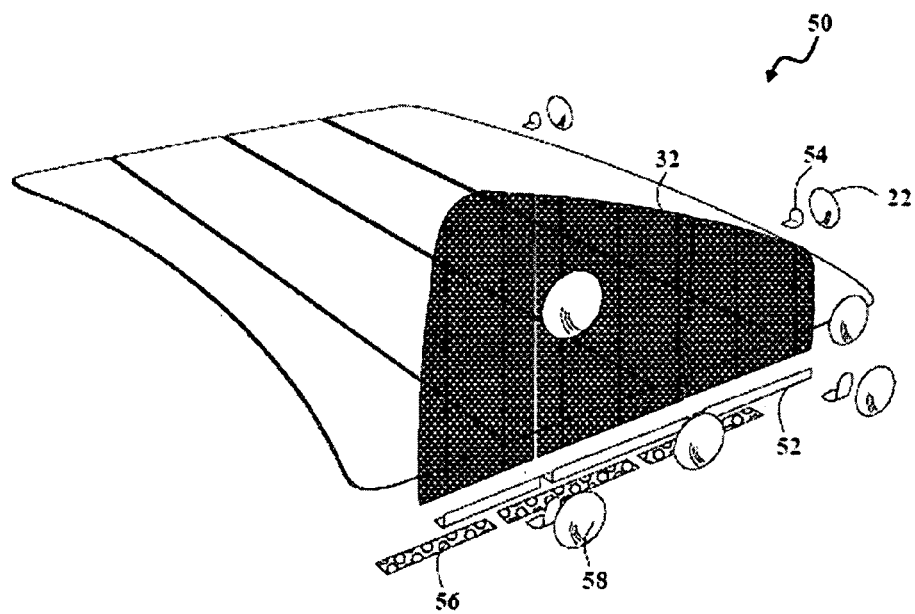
FIG. 5 is an exploded view of a lap shade.

FIG. 4 illustrates a plurality of suction cups 22, 24, 58 on both a dashboard piece 12 and a door piece 14. As in FIG. 5, a door piece 14 is attached to a dashboard piece 12 by hook and fastener means 56, 72. A cloth strip 54 is provided for a plurality of suction cups 22, 58 on the dashboard piece 12 and a plurality of suction cups 24 on the door piece 14. The door piece 14 includes a beading on a peripheral edge 32.

Figure 6:
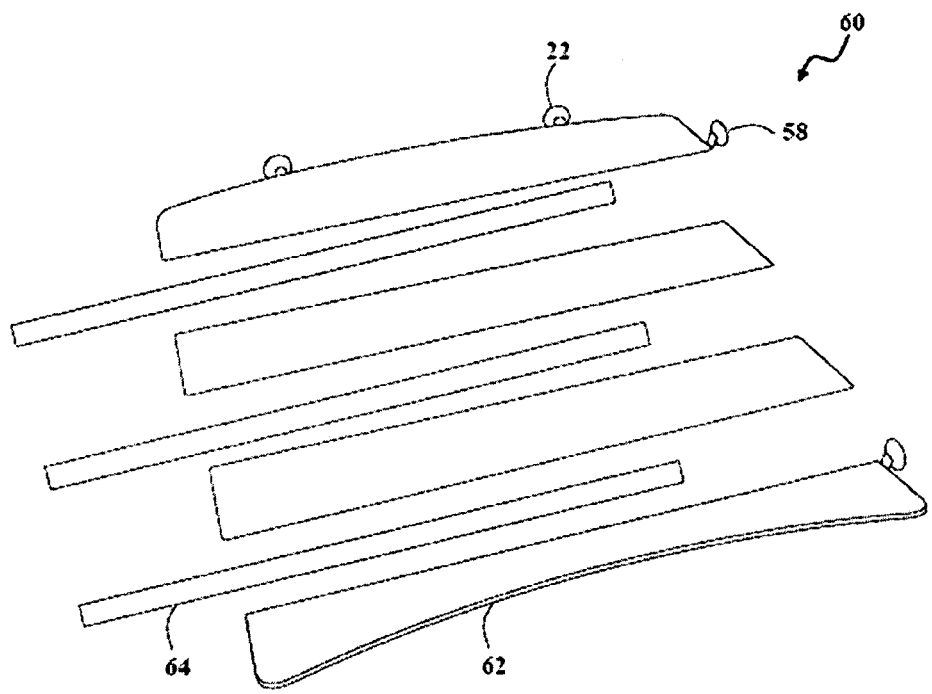
FIG. 6 is an exploded view of a dash board piece.

FIG. 6 shows a lap shade 60 with a plurality of section pads 16 having a plurality of elastic bands 64 as joints. The plurality of elastic bands 64 allows the lap shade 60 to be collapsible. A dashboard piece 12 includes a border strip 62, which can be made of foam and rubber. The dashboard piece 12 can be manufactured by placing Extended Polyethylene ("EPE")

foam, 12 micron aluminized film and nylon fabric above and below a basic shape-Polypropylene ("PP") sheet. An excess dimension of EPE foam, 12 micron aluminized film and nylon fabric around border of basic shape-PP sheet are further folded to stitch all together. Then, a hook and fastener 72 is fixed at a bottom side 74 of the dashboard piece 12.

Figure 7:
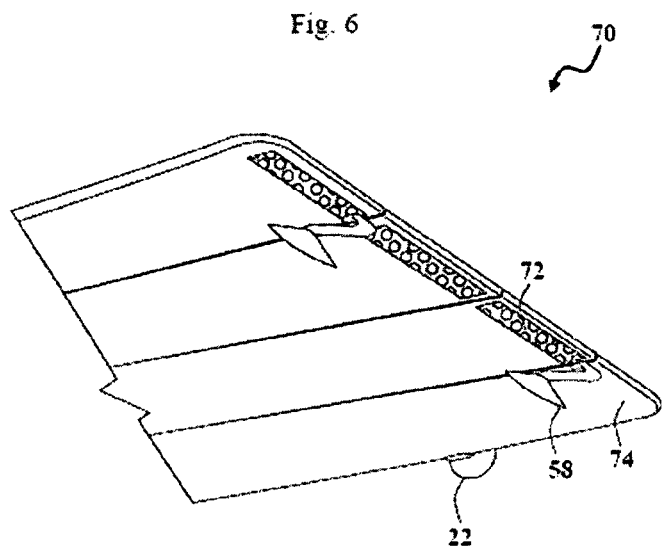
FIG. 7 is a cutaway bottom view of a dash board piece with folded side suction cups.
Figure 8:
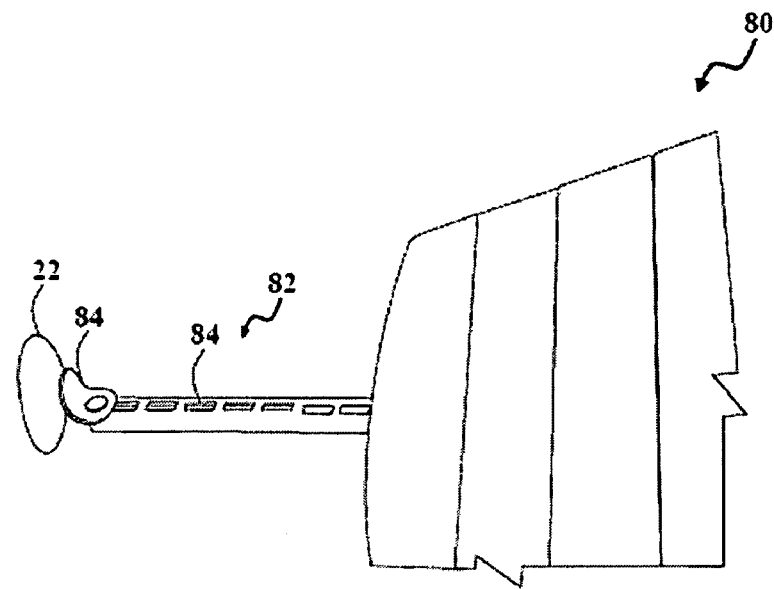
FIG. 8 is a cutaway view of a dash board piece with an extended suction cups.
Figure 9:
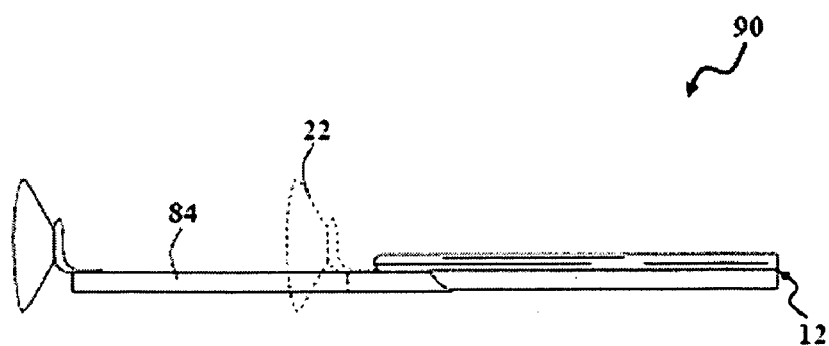
FIG. 9 shows a sliding mechanism for a suction cup.

As in FIG. 7, the hook and fastener at a bottom side 72 of a dashboard piece 12 is engaged with the hook and fastener of a door piece 56. A plurality of suction cups 58 on the dashboard piece 12 is foldable. FIGS. 8 and 9 show a plurality of suction cups 22 on dashboard piece 12 provided with a sliding mechanism 82. A sliding mechanism 82 includes a slider assembly 84, which allows the plurality of suction cups 22 to be extended as desired.

Figure 10:
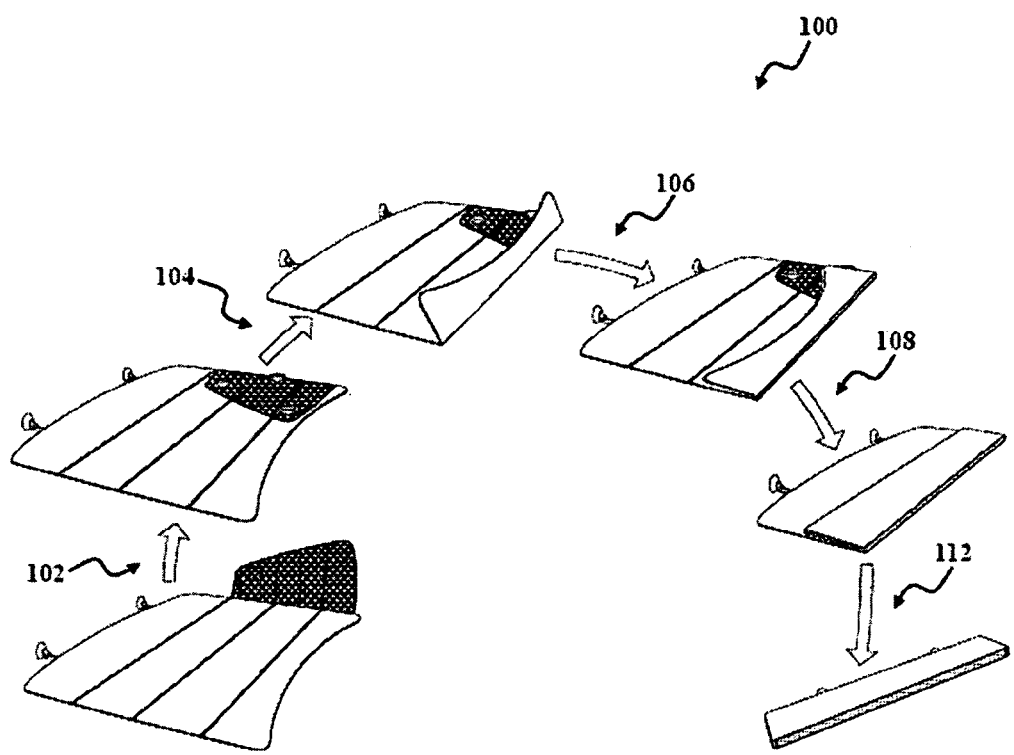
FIG. 10 shows folding sequences of a lap shade.

FIG. 10 illustrates a sequence of steps involved in folding a lap shade 10. In step 102, a door piece 14 is folded against a dashboard piece 12. The door piece 14 along with the dashboard piece 12 is folded as in steps 104, 106, 108 and 112 to store when the lap shade 10 is not in use.

Figure 11:
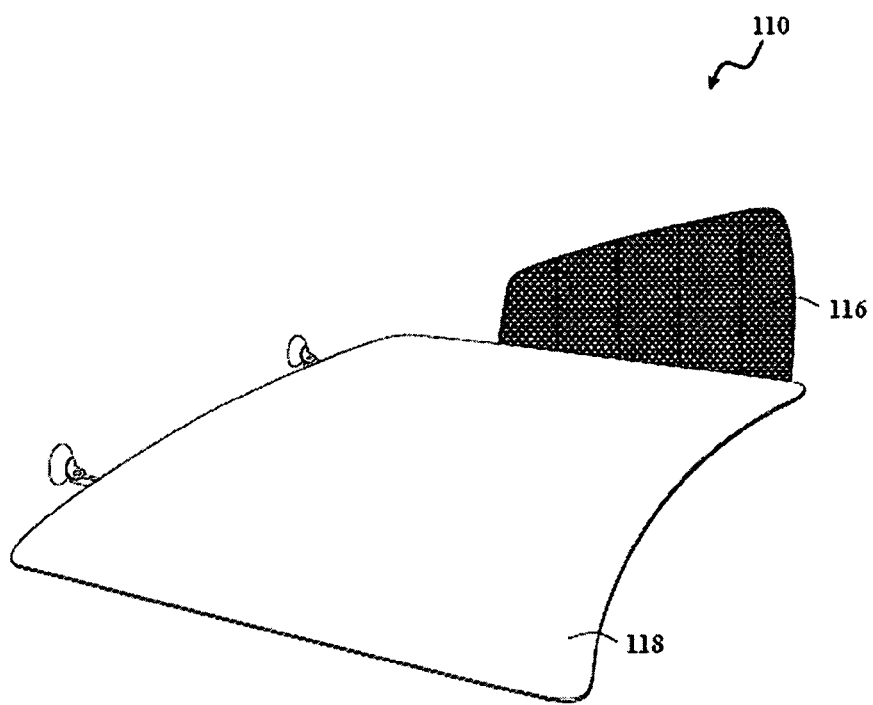
FIG. 11 is a perspective view of an alternate embodiment of a lap shade.
Figure 12:
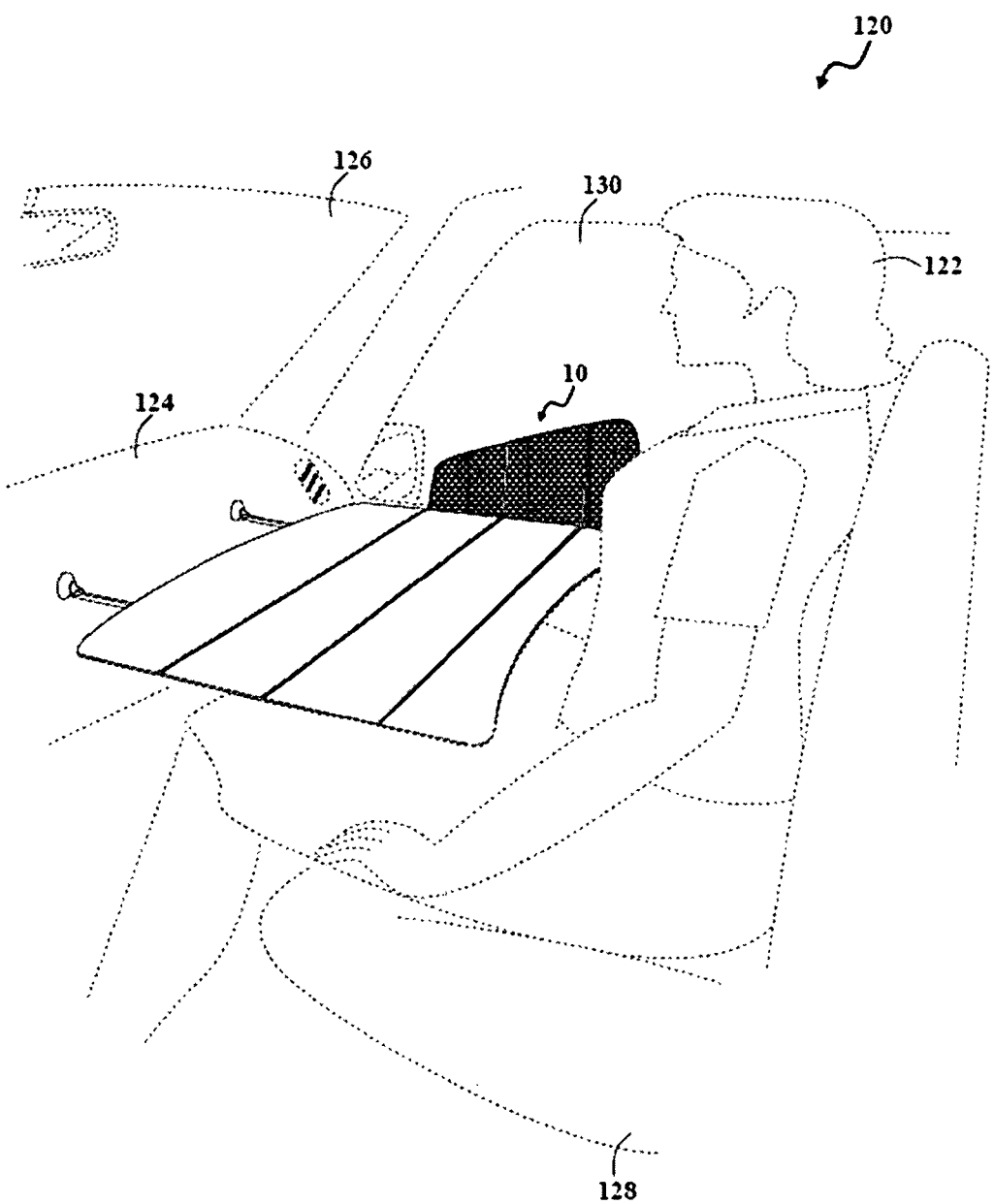
FIG. 12 is a perspective view of a lap shade in use.

FIG. 11 is an alternate embodiment 110 of a lap shade 10 showing a dashboard piece 118 and a door piece 116 made from a single piece. As in FIG. 12, a plurality of suction cups 22 on a dashboard piece 12 attach the dashboard piece 12 to a dashboard 124 of a vehicle 126. Likewise, a plurality of suction cups 24 on the door piece 14 attaches the door piece 14 to a side window 130 of the vehicle 126.

Thus, specific embodiments and applications of the lap shade have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A lap shade for an occupant in a vehicle seat comprising:
   a plurality of section pads attached to form a dashboard piece, the section pads having a plurality of joints;
   a plurality of frames attached to form a door piece, the frames having a plurality of joints;
   a plurality of attachment means on a dashboard piece and a door piece for attachment purposes;
   whereby the dashboard piece and the door piece together form the lap shade to prevent sunlight from falling on the occupant.

2. The lap shade as recited in claim 1, wherein the door piece is attached to the dashboard piece by hook and fastener means.

3. The lap shade as recited as claim 1, wherein said joints of the section pads consists of elastic bands.

4. The lap shade as recited as claim 1, wherein said frames attached to the door piece consisting of metal.

5. The lap shade as recited as claim 1, wherein said attachment means comprising of suction cups.

6. The attachment means as recited in claim 5, wherein the plurality of suction cups on the dashboard piece attaches the dashboard piece to a dashboard of the vehicle.

7. The attachment means as recited in claim 5, wherein the plurality of suction cups on the door piece attaches the door piece to a side window of the vehicle.

8. The lap shade as recited in claim 1, wherein the plurality of joints allow the lap shade to be collapsible.

9. The lap shade as recited in claim 1, wherein the plurality of attachment means on the dashboard piece is provided with a sliding mechanism.

10. The lap shade as recited in claim 1, wherein the lap shade is foldable.

11. The lap shade as recited in claim 1, wherein the dashboard piece can be made from any flexible material.

12. The lap shade as recited in claim 1, wherein the door piece can be made from any type of mesh.

\* \* \* \* \*